United States Patent [19]
Vermeulen et al.

[11] Patent Number: 5,713,190
[45] Date of Patent: Feb. 3, 1998

[54] APPARATUS FOR CONTROLLING A POSITION-ADJUSTABLE IMPLEMENT

[75] Inventors: Antoon Germain Vermeulen, Ruddervoord-Oostkamp; Paul Ernest Maria Snauwaert, Damm; Bert Juul Frans Paquet, Sint-Andries-Brugge; Freddy Christian Slabbinck, Zedelgem; Yvan Cyriel Cornelius Vandergucht, Lo-Reninge; Stefaan Danneels, Hooglede, all of Belgium

[73] Assignee: New Holland North America, Inc., New Holland, Pa.

[21] Appl. No.: 717,385

[22] Filed: Sep. 20, 1996

[30] Foreign Application Priority Data

Sep. 26, 1995 [GB] United Kingdom ............... 9519565
Aug. 30, 1996 [EP] European Pat. Off. ........... 96202420

[51] Int. Cl.⁶ .......................... A01D 75/18; A01F 19/00
[52] U.S. Cl. ................................. 56/10.2 E; 56/DIG. 15
[58] Field of Search .................... 56/10.2 E, 10.2 D, 56/10.2 F, 10.2 R, DIG. 15

[56] References Cited

U.S. PATENT DOCUMENTS 3,722,193  3/1973  Strubbe .................................... 56/208
3,953,959  5/1976  Decruyenaere ........................ 56/208
4,565,056  1/1986  Heidjann ................................ 56/14.4
4,573,124  2/1986  Seiferling ......................... 56/10.2 E X

FOREIGN PATENT DOCUMENTS

0511768A2  4/1992  European Pat. Off. .
5038222    2/1993  Japan .......................... 56/10.2 E Primary Examiner—Terry Lee Melius
Attorney, Agent, or Firm—John W. Stader; Larry W. Miller; Frank A. Seemar

[57] ABSTRACT

The disclosure relates to an apparatus for controlling the position of a header relative to the ground surface, the apparatus including one or more pivotable shoes arranged to contact the ground and to move in dependence on changes in the ground contour. A further member secured to such a pivotable shoe includes a reflecting surface remote from the point of contact of the shoe with the ground surface. An emitter/receiver is spaced from the reflecting surface and connected to a control circuit whereby the position of the header relative to the ground may be measured by virtue of the position of the reflecting surface. The position of the header relative to the ground surface is then adjustable in dependence on the detected measurements, by means of various actuators associated with the apparatus.

11 Claims, 3 Drawing Sheets

APPARATUS FOR CONTROLLING A POSITION-ADJUSTABLE IMPLEMENT

BACKGROUND OF INVENTION

This invention relates to an apparatus for controlling the position, especially the height, relative to a surface of a position-adjustable implement, in particular but not exclusively, carried by a vehicle movable over such a surface. In particular, but not exclusively, the invention relates to an apparatus for controlling the height relative to ground of a height-adjustable implement on an agricultural vehicle such as a harvesting machine, in particular a combine harvester.

As is well known in the art of agricultural vehicles, it is important to control the height of the header of a harvesting machine relative to the ground with a high degree of accuracy. It is also important that such an implement is capable of reacting rapidly to changes in the terrain in order to maintain its height relative to the ground.

In the past, control of such implements was achieved simply by virtue of constant vigilance on the part of the vehicle operator, with the aim of manually adjusting the height of the implement on spotting that the implement was about to encounter a change in the terrain.

The numerous disadvantages of such an approach have led to the development of various automatic and semi-automatic control apparatuses for height-adjustable agricultural implements.

U.S. Pat. No. 3,722,193 and U.S. Pat. No. 3,953,959 disclose arrangements including ground-sensing members that are pivotably secured to the header of a harvesting machine. As the header encounters a change in the terrain, the ground-sensing members pivot in response and send electrical signals to a control circuit. This, in turn, operates actuators that raise or lower the header in order to maintain it at a constant distance from the surface of the ground.

An alternative proposal, in U.S. Pat. No. 4,565,056, is to employ an optical emitter-sensor device that uses measurements of the time between emission of optical signals to, and reflection of optical signals from, the ground in order to indicate the position of the header relative to the surface of the ground. However, this apparatus gives false readings when the header is passing over crops and foliage that have been knocked over or partially cut. Another disadvantage of this proposal is that the stems and leaves of crops that pass between the emitter-sensor and the ground can block the optical signals entirely.

Yet a further proposal, in European Patent No. 0,511,768, is to use sonic energy instead of optical energy to sense the position of the header relative to the surface of the ground. Such an arrangement is generally successful since the sonic pulses readily pass through damaged crops and foliage to be reflected by the surface of the ground below. Nevertheless, this system also suffers from false readings caused by reflections of the signals from crop stems and foliage.

Thus, there is a need for a simple, robust apparatus for sensing the position relative to the ground of a height-adjustable implement on an agricultural vehicle, which apparatus does not give false readings when the implement passes over cut crop stems and is reliable even when there are crop stems and leaves in the vicinity of the implement.

SUMMARY OF THE INVENTION

The invention provides an apparatus for controlling the position of a position-adjustable implement relative to a surface. The apparatus comprising:

a transceiver for use in detecting the position of the implement relative to the surface; said transceiver comprising a source of signals for emitting signals and a receiver for receiving echoed signals;

a controller operable to use said signals for controlling actuator means to adjust the position of the implement relative to the surface; and characterized in that it also comprises:

a first member movably secured to the implement and having a surface-engaging portion for, upon contact with the surface, positioning said first member relative to the implement in dependence on the position of said implement relative to said surface;

a further member moveable in dependence on movement of the first member; the further member including a signal relaying portion remote from the surface-engaging portion and at a distance from the transceiver; the source of signals being disposed to emit signals towards the signal relaying portion; the receiver being disposed to receive signals from said source as echoed from the relaying portion and the controller being operable to use said signals for effecting said position adjustment.

When employed in an agricultural apparatus, this arrangement advantageously permits sensing of the position of an implement at a location remote from a crop-cutting area thereof. Thus there is no danger of interference by dirt and falling crops in the path between the signal transmitter/receiver and the relaying portion. Additionally, the first member can be constructed as a robust item.

In preferred embodiments, especially those including adjustable agricultural implements, the first member is pivotably secured on these implements. Preferably, the further member is rigidly secured to the first member. Alternately, there may be provided one or more further operative mechanisms such as linkages, gears, actuators and/or resilient members providing an operative connection between the first member and the further member.

Conveniently the apparatus is carried by a vehicle, such as a combine harvester, moveable over a surface and the signal relaying portion lies rearwardly of the implement when the vehicle is moving forwardly over the surface. This feature advantageously minimizes the chance of interference by dust, dirt and falling foliage in the sensing process, when the apparatus is used in an agricultural vehicle. Additionally, the configuration of the first member and the further member minimizes the chance of the first member digging into the ground. In particularly preferred embodiments, the first member is constituted as a shoe such as the shoes of a harvesting machine header.

Preferably, the signal relaying portion includes a reflecting portion that preferably is a surface of, or secured to, the further member. In one embodiment the surface is generally flat; in an alternative embodiment, the surface is at least partly non-planar, for example saw-toothed.

Conveniently, the source of signals includes a signal transmitter, spaced from the relaying portion, for transmitting signals thereto. Preferably the transmitter emits and the receiver receives sonic signals.

Preferably, the signal receiver is spaced from the reflecting portion by a distance in the range of 20 to 60 centimeters (cms). This advantageously allows the use of preferred receiving devices that operate in sonic wavelength ranges. A preferred sensing device is known as Bosch Sensor 0538009250.

It is preferable that the apparatus includes means for limiting movement of the first member. The apparatus may also optionally include a latch for temporarily securing the first member against movement. These features are of benefit when transporting the implement on which the apparatus is provided.

In preferred embodiments, the apparatus includes two or more first members as previously discussed and a corresponding number of further members, signal relaying portions, sources of signals and signal receivers. Conveniently, the first members are arranged in operative pairs, whereby adjustment of the implement occurs when movement of both members of a said pair is detected by the controller.

The invention is also considered to reside in a vehicle incorporating apparatus as previously discussed, in particular a harvesting machine and further in particular a harvesting machine having a header including at least one pivotable shoe constituting the first member. One form of such a vehicle may include a pair of such pivotable shoes constituting a pair of first members and optionally one or more fixed shoes of a conventional design. The respective first members may be spaced from one another, with one or more fixed shoes as aforesaid interposed between. Optionally, the controller may be configured selectively to operate the header in known height adjustment, lateral flotation and compensation modes.

The invention is also considered to reside in a position adjustment apparatus for an agricultural implement, employing an ultrasound distance sensor, the spacing between the signal emitter/receiver and signal reflecting part of which is in the range of 20 to 60 cms.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION OF THE INVENTION

Figure 1:
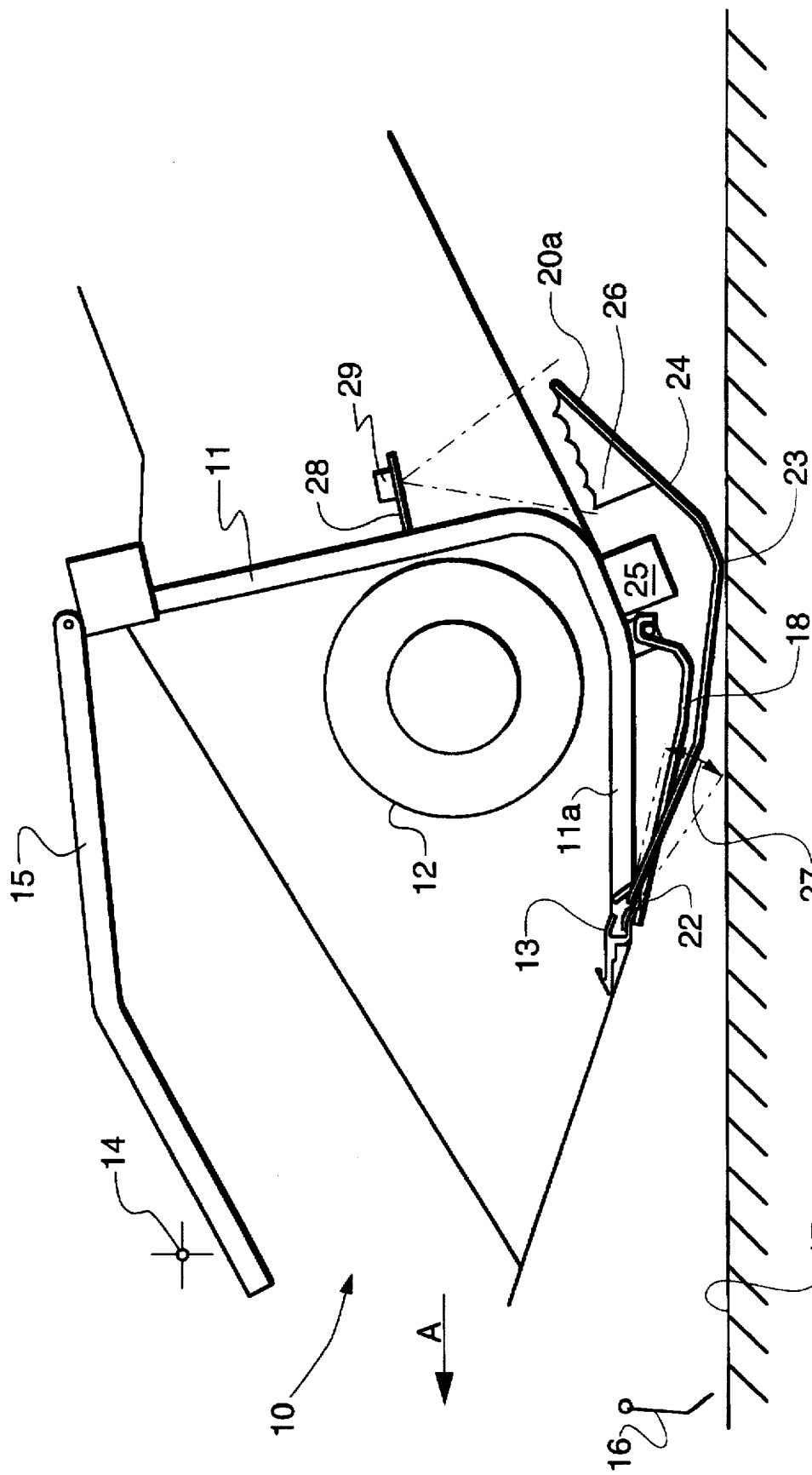
FIG. 1 is a schematic side elevational view of a combine harvester header embodying an apparatus in accordance with the invention.

Referring to the drawings, there is shown only the header 10 of a combine harvester, the header including a trough 11 essentially of conventional design surrounding a conventional auger 12. At the forward edge of a lower wall 11a of the header 10 defined by trough 11, there is secured a conventional cutterbar 13.

A conventional reel mounted on reel arms 15 is shown only schematically at 14, which reference numeral signifies the axis of the reel. One tine 16 of the reel 14 is shown at its lowermost position, just above the ground surface 17. The header 10 also includes conventional crop dividers 21 at each transverse end.

The lower wall 11a of the header 10 defined by trough 11 extends in a conventional manner across the width of the header. A series of fixed shoes 18 are secured to the underside of lower wall 11a, so as to provide a fixed shoe zone 19 extending across the central portion of the underside of the header 10.

Respective pivotable shoes 20a, 20b are secured on the underside of wall 11a at the respective extreme ends thereof, beyond the fixed shoe zone 19. Each pivotable shoe 20a, 20b is pivotably secured at its forwardmost end (as defined by the direction of forward movement of the vehicle, indicated by the arrows A) to the underside of lower wall 11a by means of a suitable hinge or pivot 22.

Each pivotable shoe 20a, 20b extends rearwardly and downwardly of the associated pivot 22 in a generally arcuate manner. Approximately two thirds of the way along its length, each pivotable shoe 20a, 20b then curves upwardly to define: (i) a portion 23 intended to engage and ride upon the ground surface 17; and (ii) a further member 24 extending upwardly and rearwardly beyond a lower main transverse beam 25 of the header 10.

It will be appreciated that the theoretical point of contact of the pivotable shoes 20a, 20b with the ground surface 17 will be located further to the rear when the system is set to position the header 10 at a substantial height above the ground surface 17 and closer to the cutter bar 13 when the system is set to position the header 10 closely above the ground level. This is advantageous to the extent that the system reacts sooner to any variation in the ground level when the system is set to follow the ground contour rather closely, i.e., when the system is set to position the header at a short distance above the ground level. Indeed, in this later operating condition, the apparatus should operate more accurately and the system reaction time should be shorter.

Each further member 24 terminates in an upwardly directed surface (or signal relaying portion) 26. This surface 26 is either secured or integral with the further member 24. A support bracket 28 is secured to and extends rearwardly of trough 11 so as to support a transceiver 29 spaced above the surface 26.

Figure 2:
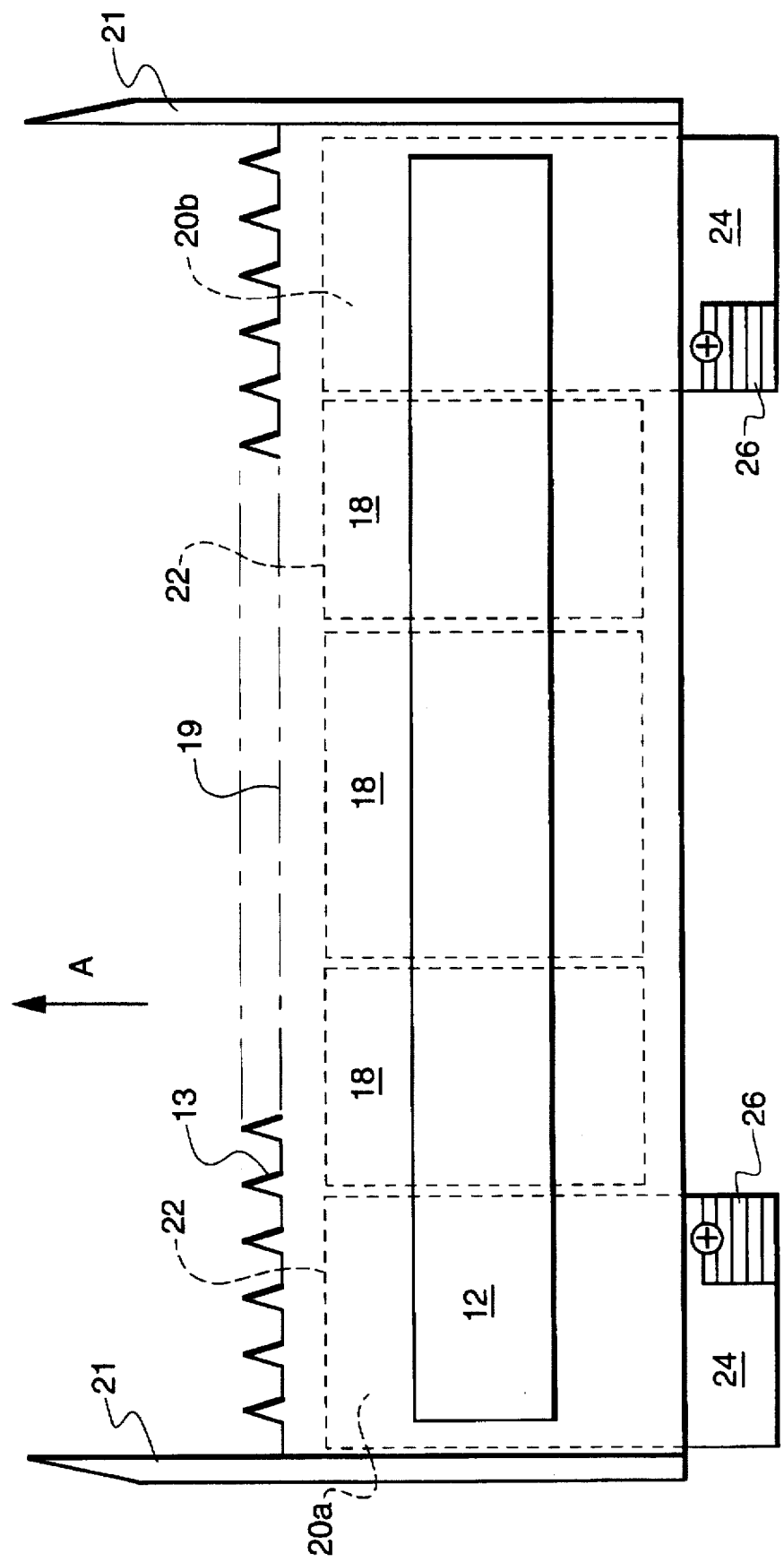
FIG. 2 is a plan view from above of the combine harvester header of FIG. 1.

As shown in FIG. 2, surface 26 extends only part-way across the width of each respective pivotable shoe 20a, 20b. However, it is possible to devise embodiments in which the surface 26 extends across the entire width of each pivotable shoe with which it is associated.

It will thus be appreciated that the pivotable shoes 20a, 20b are movable in a vertical plane of movement. Movement of the pivotable shoes 20a, 20b is limited to the angle 27 indicated by the dotted lines in FIG. 1. This is achieved firstly by virtue of each pivotable shoe 20a, 20b being engageable with a downwardly-extending part on the underside of the header trough 11 such as the main beam 25 thereof or a resilient stop provided thereon; and secondly by virtue of e.g. a chain or similar flexible member interconnecting each pivotable shoe 20a, 20b and the underside of the header trough 11 in order to limit the downward movement of each said pivotable shoe. These features are intended to ensure firstly that the surface 26 does not become damaged as a result of excessive upward travel of the pivotable shoes; and secondly that the pivotable shoes do not engage the ground when the header 10 is lifted to its uppermost position for transportation of the vehicle on which it is mounted.

When the header 10 is located in a working position, the pivotable shoes 20a, 20b move within the angular range 27 by virtue of engagement of their respective undersides 23 with the ground surface 17. Consequently, the distance between surface 26 and transceiver 29 is directly indicative of the height of the header 10 above the ground surface 17 in the sense that, as this distance is reduced, the height of the header 10 above the ground is increased.

In the embodiment shown, the transceiver 29 is an ultrasound device. The surface 26 is formed with irregularities or corrugations, in order to ensure reflection of ultrasound signals from the surface 26 back to the emitter/receiver 29 regardless of the angle of surface 26, which angle will, of course, change as the height of header 10 relative to ground surface 17 is varied.

Furthermore, the header 10 may be provided with a latching mechanism (that may be of conventional design) for locking the pivotable shoes 20a, 20b in a raised position relative to the underside of the header 10. This feature is advantageous, although not essential, when the header 10 is operated in its so-called 'compensation' mode. In this mode, the header 10 is suspended in a conventional manner in the vehicle so as to ride with a predetermined minimal ground pressure on the ground surface 17. This feature is further also advantageous for facilitating the depositing of the header 10 on a header transport wagon for road transport purposes.

In the embodiment shown, the pivotable shoes 20a, 20b are each approximately of the same width as the respective fixed shoes 18 that may be in the range of 50 to 150 cms. This advantageously prevents the apparatus from falsely adjusting the height of header 10 when one of the pivotable shoes 20a, 20b encounters a narrow recess or protuberance forming part of ground surface 17.

However, the header 10 could also be arranged to function with much narrower pivotable shoes in the range of a few centimeters only. In such an embodiment (not shown in the drawings), it would be desirable to provide such narrow, pivotable shoes in pairs with the members of each pair lying a predetermined distance apart. The pivotable shoes and/or the control circuit (described below) could be configured only to adjust the position of the header 10 in the event of both members of a pair of pivotable shoes encountering a change in the ground surface 17. Such an arrangement would avoid the problem of false adjustments of the header position occurring on one of the narrow, pivotable shoes encountering a narrow recess or protuberance.

This arrangement is particularly advantageous when the header 10 is used in a field containing rocks. The operator of a combine harvester using the control circuit described below may set the header thereof so as to produce a stubble height of, for example, 15 cm in order to avoid damage to the cutter bar 13. If under such circumstances a wide pivotable shoe 20a, 20b, such as shown in FIG. 2 is employed, the position of the header 10 would be adjusted in the event of any part of one of the pivotable shoes 20a, 20b encountering a rock or other protuberance. If, on the other hand, pairs of comparatively narrow pivotable shoes are employed, the contacting of such a rock or protuberance by one of the pivotable shoes of a pair would not result in adjustment of the position of header 10. Thus the desired general cutting height is maintained notwithstanding said contacting of a rock.

Figure 3:
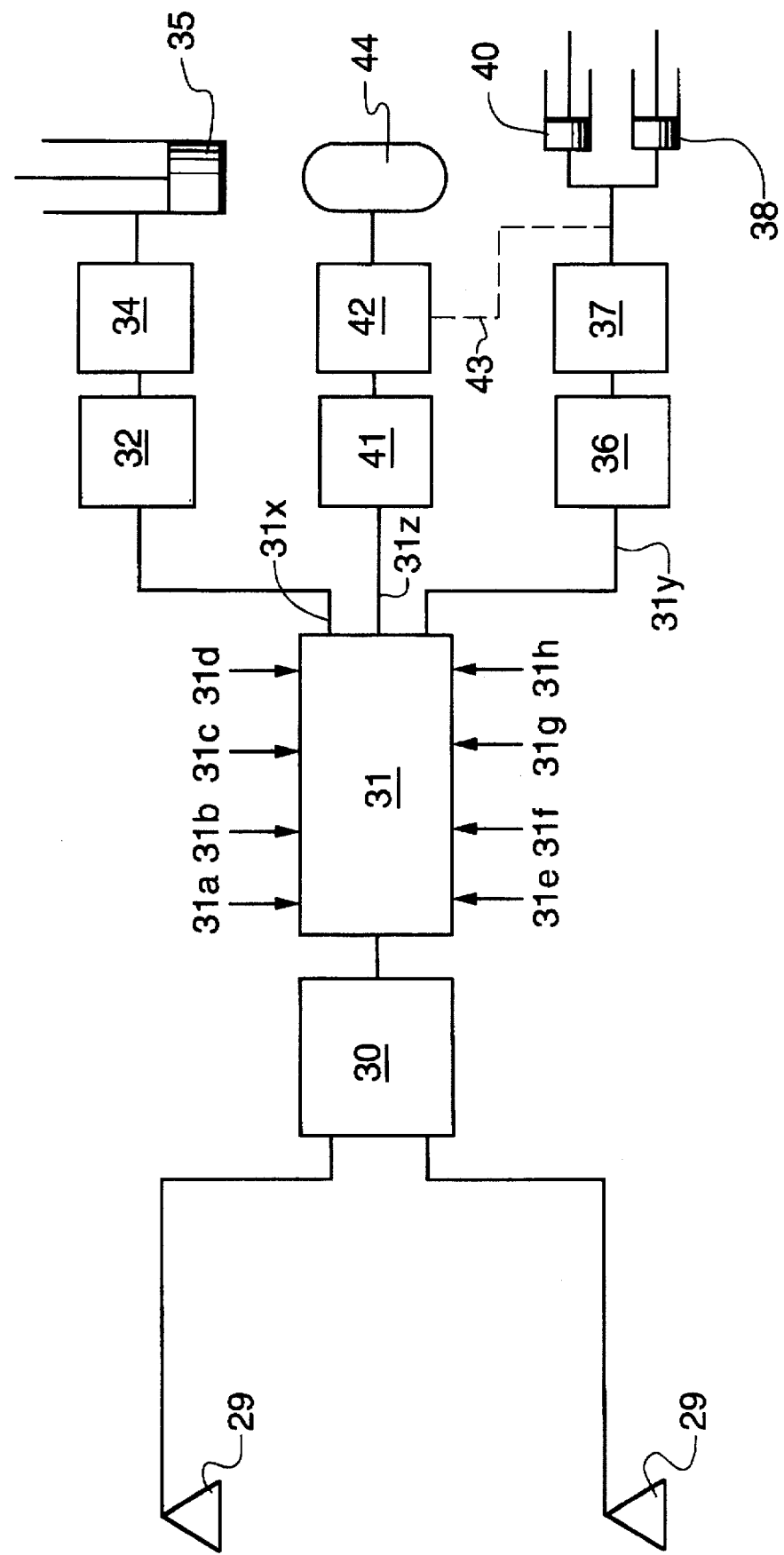
FIG. 3 is a block diagram of a control circuit associated with the apparatus illustrated in FIGS. 1 and 2.

Referring now to FIG. 3, there is shown a schematic block diagram of a control circuit for the apparatus shown in FIGS. 1 and 2. The ultrasonic transceivers 29 are shown coupled via a sensor interface 30 to a microprocessor 31. Microprocessor 31 includes a number of inputs 31a, 31b, etc., that are additional to the input from sensor interface 30. The additional inputs 31a, 31b, etc., relate to other control functions of the circuit.

One output 31x of the microprocessor 31 is coupled via a lateral flotation interface 32 to a hydraulic control valve 34 for controlling a lateral flotation cylinder 35 acting between the header 10 and the straw elevator pivotally supporting the header in a lateral vertical plane on the harvesting machine in which the apparatus of the invention is incorporated.

When the header 10 operates in its lateral flotation mode (i.e. when the header 'rides' on the ground in a known manner), the position of cylinder 35 is controlled by means of the components of the circuit of FIG. 3 in dependence on the differences in the distances measured by the respective ultrasonic sensors 29, i.e., in dependence on the differences in the heights of the header 10 above the ground sensed by the respective pivotable shoes 20a, 20b.

A second output 31y of microprocessor 31 is coupled via a stubble height interface 36 to a hydraulic valve 37 controlling the header lifting cylinders 38, 40. These cylinders extend between the header 10 (in practice the elevator upon which the header 10 is mounted) and the vehicle chassis on either side of the elevator.

When the apparatus operates in the 'stubble height' mode, the desired stubble height is inputted via one of the inputs 31a, 31b, etc. to the microprocessor 31 and the absolute values of the signals from the ultrasonic sensors 29 are used for controlling the position of the header 10 above the ground surface 17. The ultrasonic sensors 29 are thus used for both the height control of the header and the lateral flotation of the header.

When it is required to use the header in the so-called 'compensation' mode, the ultrasonic sensors 29 are not used for the compensation operation as such. In this 'compensation' mode, the header is adjusted to ride over the ground surface 17 with a predetermined minimal ground pressure and thus, to 'float' upwardly and downwardly in a manner to follow the ground contour. To this end, a third output 31z of microprocessor 31 is coupled via a compensation interface 41 to a hydraulic valve 42 controlling both the header lifting cylinders 38, 40 (via control line 43) and a hydropneumatic accumulator 44, the function of which, in the compensation mode operation, is well known. In this compensation mode, the microprocessor 31 receives input signals on one of its inputs 31a, 31b, etc. This is representative of the hydraulic pressure in the header lifting cylinders 38, 40 and, to this end, an oil pressure sensor is coupled to the hydraulic circuitry of the header lifting cylinders 38, 40.

However, in this 'compensation' mode, lateral adjustment of the header position is also accomplished in the manner as described above in connection with the operation in the 'lateral flotation' mode. Thus, although the ultrasonic sensors 29 are not used in the 'compensation' mode for the compensation operation per se, they are nevertheless used, in this 'compensation mode' for accomplishing an additional lateral adjustment so as to take an eventual laterally inclined ground contour into account. This is advantageous to the extent that, on the one hand, the machine is subjected to less wear and tear and, on the other hand, a more even distribution of the header pressure on the ground surface is obtained.

Furthermore, the microprocessor 31 may also be programmed for, in the 'compensation' mode, quickly lifting the header 10 in the event of the oil pressure sensor associated with the header lifting cylinders 38, 40 sensing a sudden and substantial drop in the hydraulic pressure. This is advantageous for avoiding the so-called 'bulldozing' of the header and/or the shoes 18, 20 digging into the ground when, in said 'compensation' mode, the header encounters a sudden and substantial rise in the ground surface, i.e., when the header encounters a substantial obstacle.

Microprocessor 31 may include additional outputs for controlling other aspects of the operation of the header or of the vehicle in which it is installed. As an example, the microprocessor 31 may be programmed to automatically lift the header 10 when the combine harvester is driven in reverse.

Furthermore, the microprocessor 31 may function to control the operation of the header and the various ancillary components referred to in a variety of further ways that would be apparent to a worker skilled in the art.

The inputs 31a, 31b, etc. to the microprocessor 31 may include:

a selection switch for selecting the operation mode;

a manual control of the raising and lowering of the header;

a manual control of the lateral floatation of the header;

a selector for the desired stubble height (when the header is in use in the stubble height control mode);

a selector for the ground pressure (when the header operates in the compensation mode); and an oil pressure sensor (sensing and optionally indicating the pressure in the header lift cylinders). For a more detailed description of a control circuit similar to the one briefly described above, reference may be made to European Patent No. 0,511,768.

It will be appreciated that the sensors 29 need not necessarily be of the ultrasonic type. It is desirable that the sensors 29 are of a 'contactless' type; preferably employing electromagnetic energy. However, numerous options may be employed and it is possible to conceive versions of the invention in which yet further kinds of sensors are employed.

Furthermore, the invention may be employed in machinery other than agricultural harvesters. Indeed, the apparatus of the invention is applicable in virtually any situation in which it is desired to control the spacing of an implement relative to a surface. In particular, the invention is not limited to embodiments in which the pivotable shoes or their functional equivalents are moveable over the surface in question.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred description, may be employed in other embodiments without departing from the scope of the invention. Accordingly, the following claims are intended to protect the invention broadly as well as in the specific form shown.

What is claimed is:

1. An improved apparatus for controlling the position of a position-adjustable implement relative to a surface, the apparatus having:

a transceiver for use in detecting a position of the implement relative to the surface; said transceiver comprising a source of signals for emitting signals and a receiver for receiving echoed signals;

a controller operable to use said signals for controlling an actuator means to adjust the position of the implement relative to the surface, wherein the improvement comprises:

a first member moveably secured to the implement and having a surface-engaging portion for, upon contact with the surface, positioning said first member relative to the implement in dependence on the position of said implement relative to said surface; and a further member moveable in dependence on movement of the first member, said further member rigidly secured to the first member, the further member including a signal relaying portion remote from the surface-engaging portion and at a distance from the transceiver, the source of signals being disposed to emit signals towards the signal relaying portion, the receiver being disposed to receive signals from said source as echoed from said signal relaying portion and the controller being operable to use said signals for effecting said position adjustment.

2. Apparatus according to claim 1, wherein the first member is pivotably secured on the implement and the further member is rigidly secured to the first member.

3. Apparatus according to claim 2, wherein the implement is carried on a vehicle moveable over the surface, the first member is constituted as a moveable shoe and the signal relaying portion lies rearwardly of the implement when the vehicle is moving forwardly over the surface.

4. Apparatus according to claim 3, wherein the transceiver emits and receives sonic signals.

5. Apparatus according to claim 4, wherein the transceiver is spaced from the signal relaying portion by a distance in the range of 26 to 60 centimeters.

6. Apparatus according to claim 5, further comprising means for limiting movement of the first member.

7. Apparatus according to claim 6, wherein the limiting means is a latch provided for temporarily securing the first member against movement.

8. Apparatus according to claim 7, wherein the first member has a corresponding number of further members, signal relaying portions and transceivers.

9. Apparatus according to claim 8, wherein the first member and further member are arranged in an operative pair, whereby adjustment of the implement occurs when movement of both members of a said pair is detected by the controller.

10. Apparatus according to claim 9, wherein the signal relaying portion further comprises a reflecting portion in the form of a generally flat surface secured to the further member.

11. Apparatus according to claim 9, wherein the signal relaying portion further comprises a reflecting portion in the form of a surface secured to the further member; said surface being at least partly non-planar.

\* \* \* \* \*